United States Patent
Veshchikov

(10) Patent No.: US 11,204,987 B2
(45) Date of Patent: Dec. 21, 2021

(54) METHOD FOR GENERATING A TEST FOR DISTINGUISHING HUMANS FROM COMPUTERS

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 292 days.

(21) Appl. No.: 16/676,520

(22) Filed: Nov. 7, 2019

(65) Prior Publication Data
US 2021/0141876 A1 May 13, 2021

(51) Int. Cl.
G06F 21/31 (2013.01)
G06N 20/00 (2019.01)

(52) U.S. Cl.
CPC ...... *G06F 21/31* (2013.01); *G06F 2221/2133* (2013.01); *G06N 20/00* (2019.01)

(58) Field of Classification Search
CPC .......... G06F 21/31; G06F 21/36; G06F 21/50; G06F 21/55; G06F 2221/2133; G06N 20/00
See application file for complete search history.

(56) References Cited

U.S. PATENT DOCUMENTS

| | | | |
|---|---|---|---|
| 7,891,005 B1 * | 2/2011 | Baluja | G06F 21/36 726/26 |
| 7,929,805 B2 | 4/2011 | Wang et al. | |
| 8,607,331 B2 | 12/2013 | Sun et al. | |
| 8,688,940 B2 | 4/2014 | Sprouse et al. | |
| 9,558,337 B2 | 1/2017 | Gross | |
| 10,496,809 B1 * | 12/2019 | Pham | G06N 3/084 |

(Continued)

FOREIGN PATENT DOCUMENTS

| | | |
|---|---|---|
| CN | 104766001 A | 7/2015 |
| EP | 2330529 A2 | 6/2011 |

(Continued)

OTHER PUBLICATIONS

Vikram S, Fan Y, Gu G. SEMAGE: a new image-based two-factor CAPTCHA. In Proceedings of the 27th Annual Computer Security Applications Conference Dec. 5, 2011 (pp. 237-246). (Year: 2011).*

(Continued)

*Primary Examiner* — Robert B Leung
(74) *Attorney, Agent, or Firm* — Daniel D. Hill

(57) ABSTRACT

A method is provided for generating a test for distinguishing humans from computers. The computer may include a machine learning model. A reference sample in a first category is selected. A first plurality of samples is selected from the first category. The samples may be images. Adversarial examples are created for one or more of the first plurality of samples. Each of the adversarial examples are created for one or more other categories different from the first category. A second plurality of samples is selected from the one or more other categories different from the first category. An adversarial example is created from one or more of the second plurality of samples for the first category. The reference sample and first and second pluralities of samples as modified to be adversarial examples, are presented for testing by a user to determine if the user is a human or a computer.

20 Claims, 4 Drawing Sheets

(56) References Cited

U.S. PATENT DOCUMENTS

| | | | | |
|---|---|---|---|---|
| 2010/0228804 | A1* | 9/2010 | Dasgupta | G06F 16/951 345/557 |
| 2013/0347090 | A1 | 12/2013 | Foote | |
| 2017/0161477 | A1* | 6/2017 | Liu | H04L 63/12 |
| 2020/0012776 | A1* | 1/2020 | Deluca | G06F 21/316 |
| 2021/0133317 | A1* | 5/2021 | Pham | G06F 21/36 |

FOREIGN PATENT DOCUMENTS

| | | |
|---|---|---|
| EP | 3273377 A1 | 1/2018 |
| EP | 3432182 A1 | 1/2019 |

OTHER PUBLICATIONS

Kwon H, Kim Y, Yoon H, Choi D. Captcha image generation systems using generative adversarial networks. IEICE Transactions on Information and Systems. Feb. 1, 2018; 101(2):543-6. (Year: 2018).*

Y. Zhang, H. Gao, G. Pei, S. Kang and X. Zhou, "Effect of Adversarial Examples on the Robustness of CAPTCHA," 2018 International Conference on Cyber-Enabled Distributed Computing and Knowledge Discovery (CyberC), 2018, pp. 1-109, doi: 10.1109/CyberC.2018.00013. (Year: 2018).*

Shamir A, Safran I, Ronen E, Dunkelman O. A simple explanation for the existence of adversarial examples with small hamming distance. arXiv preprint arXiv: 1901.10861. Jan. 30, 2019. (Year: 2019).*

Y. Zhang, H. Gao, G. Pei, S. Luo, G. Chang and N. Cheng, "A Survey of Research on CAPTCHA Designing and Breaking Techniques," Oct. 2019, pp. 75-84. (Year: 2019).*

Biggio, Battista et al.; "Evasion Attacks Against Machine Learning At Test Time;" ECMLPKDD'13 Proceedings of the 2013 European Conference on Machine Learning and Knowledge Discovery in Databases; Sep. 23-27, 2013, Prague, Czech Republic; doi>10.1007/978-3-642-40994-3_25.

Goodfellow, Ian J. et al.; "Explaining And Harnessing Adversarial Examples;" Published as a Conference Paper at ICLR 2015, San Diego, California, May 7-9, 2015; arXiv.org > stat > arXiv:1412.6572.

Hayes, Jamie et al. "Learning Universal Adversarial Perturbations with Generative Models;" 2018 IEEE Security and Privacy Workshops (SPW), May 24, 2018; San Francisco, California; DOI: 10.1109/SPW.2018.00015.

Osadchy, Margarita et al.; "No Bot Expects the DeepCAPTCHA! Introducing Immutable Adversarial Examples, With Applications to CAPTCHA Generation;" IEEE Transactions on Information Forensics and Security; vol. 12, Issue 11, Nov. 2017; DOI: 10.1109/TIFS.2017.2718479.

Papernot, Nicolas et al.; "Practical Black-Box Attacks Against Machine Learning," 2017 ACM Asia Conference on Computer and Communications Security; Abu Dhabi, United Arab Emirates; Apr. 2-6, 2017; https://doi.org/10.1145/3052973.3053009.

Sivakorn, Suphannee et al.; "I am Robot: (Deep) Learning to Break Semantic Image CAPTCHAs;" 2016 IEEE European Symposium on Security and Privacy (EuroS&P), Mar. 21-24, 2016, Saarbrucken, Germany; DOI: 10.1109/EuroSP.2016.37.

Szegedy, Christian et al.; "Intriguing Properties Of Neural Networks;" International Conference on Learning Representations; Apr. 14-16, 2014, Banff, Canada.

Szegedy, Christian et al.; "Rethinking The Inception Architecture For Computer Vision;" 2016 IEEE Conference on Computer Vision and Pattern Recognition (CVPR); Jun. 27-30, 2016, Las Vegas, Nevada; DOI: 10.1109/CVPR.2016.308.

* cited by examiner

METHOD FOR GENERATING A TEST FOR DISTINGUISHING HUMANS FROM COMPUTERS

BACKGROUND

Field

This disclosure relates generally to protecting online platforms, and more particularly, to a method for generating a test for distinguishing humans from computers.

Related Art

There are online platforms that require a user to register with the platform before access is provided to the platform. For example, forums, online-shops, email services, online gaming, etc. may only be accessible to registered users. Usually, the services are intended to be used by humans. However, it is possible to create a computer program that will register itself as a human. These computer programs are sometimes referred to as "bots," which is short for "robot." The use of a bot may provide an attacker an opportunity to abuse the online service.

Some online services use tests designed to help distinguish human users from bots. One test that is used for this purpose is called a Turing test. A form of inverse Turing test is often used called "Completely Automated Public Turing tests to tell Computers and Humans Apart," more commonly referred to as CAPTCHA. Bots created for the purpose of accessing online services use machine learning (ML) models that are trained to classify, for example, images. To defeat the bot, a text CAPTCHA may use a distorted image of some of the text and the bot might have a text recognition module that will try to guess the text in the image. As the bots are becoming more capable, CAPTCHA images that are more difficult to solve are being used. Unfortunately, the more difficult CAPTCHAs may be too difficult for humans to solve consistently. As a result, a larger percent of the CAPTCHA tests provide false positive results while also frustrate many human users.

Therefore, a need exists for a test to distinguish humans from bots that solve the above problem.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
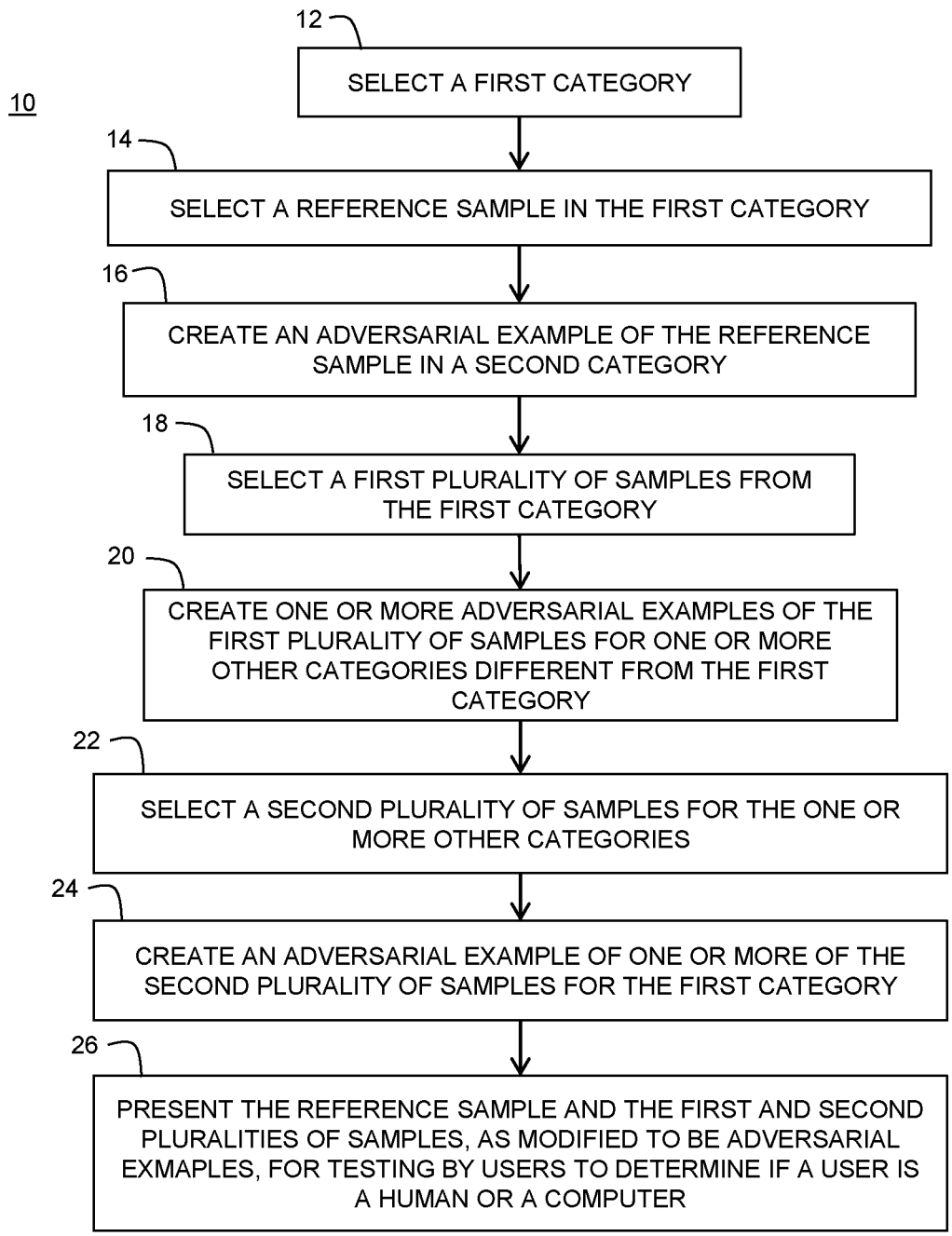
FIG. 1 illustrates a method for distinguishing humans from computers in accordance with an embodiment.

Generally, there is provided, a method for generating a test for distinguishing humans from computers. The method includes generating a CAPTCHA that includes adversarial examples. In accordance with an embodiment, the CAPTCHA includes a plurality of samples from a reference category. The samples may be images. A reference sample is chosen from the plurality of samples in the reference category. Some of the plurality of samples are in the reference category and some are in different non-reference categories. Some or all the plurality of samples are modified to be adversarial examples. The adversarial examples are arranged in the CAPTCHA and the CAPTCHA is presented to a user when access to, e.g., an online service is accessed. The goal of the test is to deceive an ML model of the bot into recognizing the adversarial example to be in a different and incorrect category that a human would be able to correctly categorize relatively easily.

In the present application for patent, adversarial examples are data samples that include intentionally perturbed features that cause a ML model to incorrectly classify the adversarial examples. The modifications, or perturbations, can be small pixel changes to features of, e.g., an image, that are imperceptible to the human eye so that a person will not mischaracterize the image, but a machine learning model of an attacking computer will likely incorrectly classify the image.

The method provides a defense against bot attacks that use a ML model for input sample classification. The described method does not make images more difficult for humans to classify while making the images more difficult for a bot to recognize.

In accordance with an embodiment, there is provided, a method for generating a test for distinguishing humans from computers, the method including: selecting a first category; selecting a reference sample in the selected first category; selecting a first plurality of samples, the first plurality of samples selected from the first category; creating adversarial examples for one or more of the first plurality of samples to create a modified first plurality of samples, each of the adversarial examples for one or more other categories different from the first category; selecting a second plurality of samples, the second plurality of samples selected from the one or more other categories different from the first category; creating an adversarial example of one or more of the second plurality of samples for the first category to create a modified second plurality of samples; and presenting the reference sample and the modified first and second pluralities of samples with the adversarial examples for testing by a user to determine if the user is a human or a computer. The method may further include creating an adversarial example of the reference sample that is for a second category different from the first category. The reference sample and the first and second pluralities of samples may be images. The reference sample and the first and second pluralities of samples may be audio files. An adversarial example may be created by adding noise to a sample. Creating adversarial examples for one or more of both the first and second pluralities of samples may further include creating adversarial examples for all of the first and second pluralities of samples. Creating adversarial examples for one or more of the first plurality of samples may further include creating adversarial examples for one or more of the first plurality of samples that are for one or more of the same categories as the second plurality of samples. The testing by a user to determine if the user is a human or a computer may further include testing using a Completely Automated Public Turing Tests to tell Computers and Humans Apart (CAPTCHA) test. Creating adversarial examples for the one or more of the first and second pluralities of samples may further include creating each of the adversarial examples to target a different machine learning algorithm.

In another embodiment, there is provided, a method for generating a test for distinguishing humans from computers, the method including: selecting a first category; selecting a reference sample in the selected first category; creating an adversarial example of the reference sample for a second category different from the first category; selecting a first plurality of samples, the first plurality of samples selected from the first category; creating adversarial examples for one or more of the first plurality of samples to create a modified first plurality of samples, each of the adversarial examples for one or more other categories different from the first category; selecting a second plurality of samples, the second plurality of samples selected from the one or more other categories; creating an adversarial example of one or more of the second plurality of samples for the first category to create a modified second plurality of samples; and presenting the reference sample and the modified first and second pluralities of samples for testing by a user to determine if the user is a human or a computer. The reference sample and the first and second pluralities of samples may be images. Creating adversarial examples for one or more of both of the first and second pluralities of samples may further include creating adversarial examples for all of the first and second pluralities of samples. Creating adversarial examples for one or more of the first plurality of samples may further include creating adversarial examples for one or more of the first plurality of samples that are for the same categories as one or more samples of the second plurality of samples. The testing by a user to determine if the user is a human or a computer may further include testing using a Completely Automated Public Turing Tests to tell Computers and Humans Apart (CAPTCHA) test. Creating adversarial examples for the one or more of the first and second pluralities of samples may further include creating each of the adversarial examples to target a different machine learning algorithm.

In yet another embodiment, there is provided, a non-transitory machine-readable storage medium including computer-readable instructions executable by a microprocessor to: select a first category; select a reference sample in the selected first category; select a first plurality of samples, the first plurality of samples selected from the first category; create adversarial examples for one or more of the first plurality of samples to create a modified first plurality of samples, each of the adversarial examples for one or more other categories different from the first category; select a second plurality of samples, the second plurality of samples selected from the one or more other categories different from the first category; create an adversarial example of one or more of the second plurality of samples for the first category to create a modified second plurality of samples; and present the reference sample and the modified first and second pluralities of samples for testing by a user to determine if the user is a human or a computer. The non-transitory machine-readable storage medium may further include instructions to create an adversarial example of the reference sample for a second category different from the first category. The instructions to create adversarial examples for one or more of both the first and second pluralities of samples may further include instructions to create adversarial examples for all the first and second pluralities of samples. The instructions to create the adversarial examples for the one or more of the first plurality of samples may further include instructions to create adversarial examples for one or more of the first plurality of samples that are for the same categories as the second plurality of samples. The instructions to create adversarial examples for the one or more of the first and second pluralities of samples may further include instructions to create each of the adversarial examples to target a different machine learning algorithm.

Figure 2:
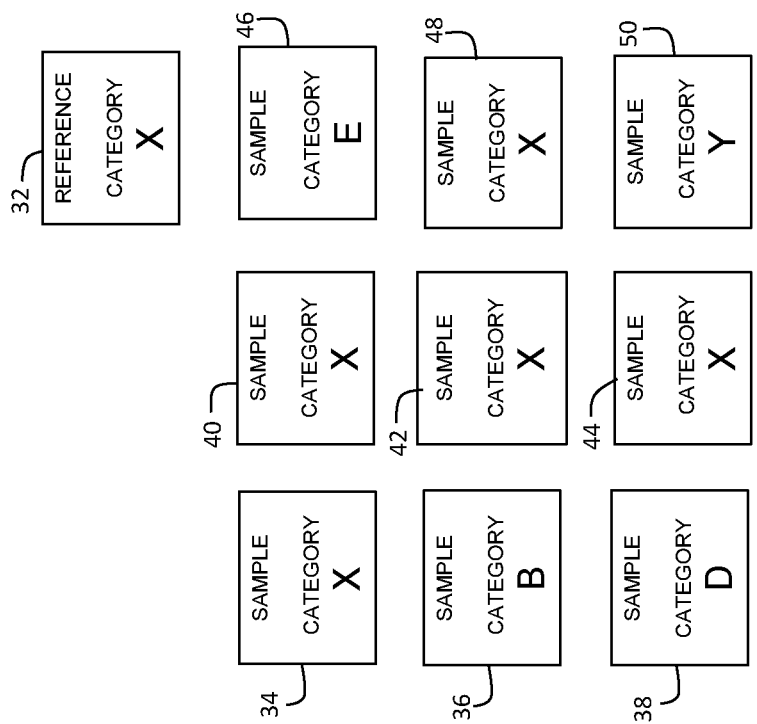
FIG. 2 illustrates a test set of samples for distinguishing a human from a computer in a first part of the method according to an embodiment.

FIG. 1 illustrates method 10 for generating a test for distinguishing humans from computers in accordance with an embodiment. Method 10 will be described referring to FIGS. 1-3. In the described embodiment, the samples are images. An image in the described embodiment can be any kind of image, such as photos, videos, paintings, drawings, text, etc. In another embodiment, method 10 can be applied to other types of samples. For example, method 10 may be applied to audio samples for people who have vision impairments. The audio samples may include speech, music, or various other sounds such as traffic, animals, construction, etc. The method begins by constructing a CAPTCHA as illustrated in FIG. 2. There are a variety of ways to construct and arrange the images of a CAPTCHA. FIG. 2 is just one example of a CAPTCHA. Generally, in a CAPTCHA, a reference image is presented, and a user is required to chosen one or more images from a set of images that are from the same category of images as the reference image. Successfully recognizing the image categories will allow the user access to a resource that is being protected by the CAPTCHA. Method 10 will be described in detail below after a description of FIG. 2 and FIG. 3.

FIG. 2 illustrates test set 30 of samples for distinguishing a human response from a computer response in a first part of method 10. FIG. 2 includes a reference sample 32 and a plurality of samples 34, 36, 38, 40, 42, 44, 46 48, and 50. Nine samples are illustrated in FIG. 2, but any number can be used. Each of the samples is chosen from a category of images. The actual images chosen for the CAPTCHA are not important for describing the invention. The images can be any images that are relatively easy for a human to recognize as being within a particular category. Reference sample 32 is an image chosen from an image category X, where X represents a category. Example categories may include photos or other images of cars, people, animals, fish, road signs, houses, etc. Each of the plurality of samples in FIG. 2 is chosen from an indicated category. For example, samples 34, 40, 42, 44, and 48 are each different images that can be recognized visually by a human as being in category X, the same category as reference sample 32. If a user marks samples 34, 40, 42, 44 and 48 correctly as being the same category as reference sample 32, then the CAPTCHA will indicate the user is a human. Even though there are five correct images in FIG. 2, there can be any number of correct images in other embodiments. The rest of the images of the CAPTCHA are filled by images that would be relatively easily recognized by a human as being different from the category X. For example, image 36 is from a category B, image 38 is from a category D, image 46 is from a category E, and image 50 is from a category Y. It does not matter what the specific categories are if the images selected from those categories can be recognized by a human as being from different categories than category X. The samples are chosen so that most humans would be able recognize samples 34, 40, 42, 44, and 48 as belonging to the same category as reference sample 32. For example, category X may be photos of turkeys, and selecting those images would establish the user as a human, and the user would then be allowed access to the protected resource. However, machine learning models are becoming more capable and can successfully recognize many of the images. Note that there can be any number of total samples in the CAPTCHA where any number of the total samples are the same category as the category of the reference images, and where the rest of the other images are from one or more categories are different from the reference category.

Figure 3:
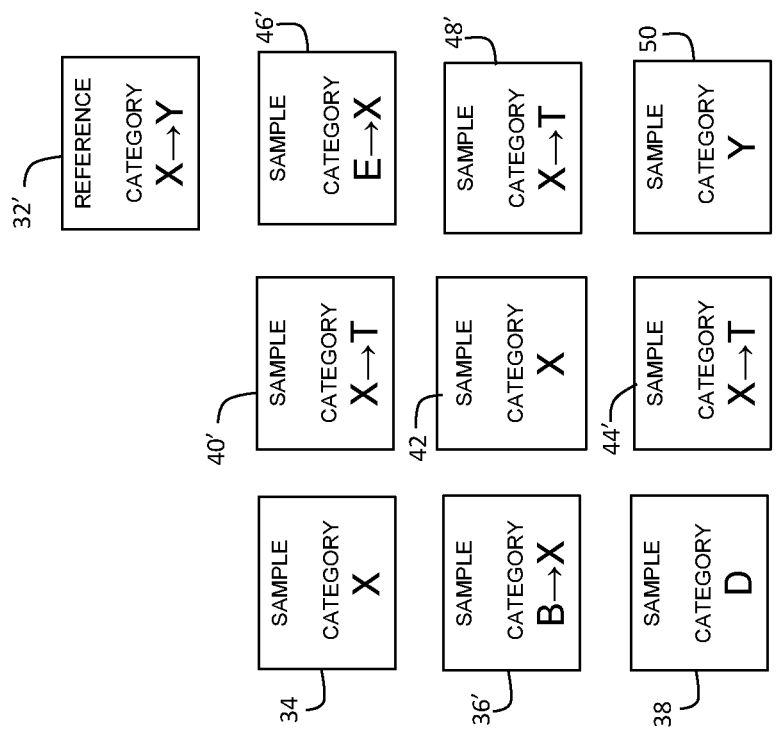
FIG. 3 illustrates a modified test set of samples of the test set from FIG. 2 in accordance with a second part of the method.

FIG. 3 illustrates modified test set 30' of the samples of FIG. 2 in accordance with a second part of method 10. The creation of an adversarial example is illustrated in FIG. 3 as, for example, X→Y, where X represents the original image category and →Y indicates that an adversarial example is created from the category X image for a category Y. This means that a human will still recognize the image as belonging to category X, as before, but a computer with an ML model will be misled into recognizing the image as belonging to category Y, where category Y is different from category X. The adversarial example 32' is substituted for the original reference image 32 (FIG. 2) as shown in FIG. 3. In another embodiment of method 10, an adversarial example may not be created from reference sample 32.

Referring back to FIG. 1, method 10 begins at step 12. At step 12, a first category is selected for reference sample 32 in FIG. 2. At step 14, reference sample 32 is selected from a first category (CATEGORY X). In one embodiment, the category for the reference sample is chosen by a software application prepared for creating the CAPTCHA in accordance with method 10. At step 16, an adversarial example is created from reference sample 32. Step 16 is illustrated in FIG. 3 where reference sample 32 is modified to be an adversarial example 32' (X→Y).

An adversarial example may be created by adding noise to a sample. There are various ways to add noise to a sample. In one embodiment, a small amount of noise may be added to disturb a few pixels of the image is added. In another embodiment, a large amount of noise is added to a small region of the image. In most adversarial examples, the amount of noise is almost undetectable by a human but will cause a ML model to misclassify an image. There are various known methods for creating adversarial examples and therefore how to create an adversarial example will not be discussed further.

In method 10, at step 18, a first plurality of samples is selected from the first category, or reference category X as illustrated in FIG. 2. As an example, five samples were chosen to be the first plurality of samples, i.e., samples 34, 40, 42, 44, and 48. A different number may be chosen for another embodiment. At step 20, one or more adversarial examples are created of the first plurality of samples for one or more other categories different from the first category to create a modified first plurality of samples. As discussed above, modifying the images to be adversarial examples is intended to cause a ML model to misclassify the images without interfering with human recognition of the images. For example, an adversarial example 40' is created from sample 40, where adversarial example 40' is for category T. Category T is a different category than category X. Likewise, adversarial example 44' is created from sample 44, and adversarial example 48' is created from sample 48. Both adversarial examples 44' and 48' are for category T. In FIG. 3, an adversarial example is not created from samples 34 and 42, but in a different embodiment, an adversarial example may be created from both samples 34 and 42. Note that generally, only one incorrect answer will cause the user to fail the CAPTCHA test, so even if an ML model is not fooled by all the adversarial examples, it is possible the ML model will be fooled by at least one of the adversarial examples. To make it more likely at least one adversarial example will cause a misclassification, different techniques can be used to create the adversarial examples to cover more than one different ML algorithm. In another embodiment, all the first plurality of samples may be modified to be adversarial examples.

At step 22, a second plurality of samples is selected from one or more other categories different from the reference category. The number of samples depends on the number of the first plurality of samples and the total number of samples in the CAPTCHA. For example, in the illustrated embodiment, there are nine total samples, where the first plurality of samples is equal to five, so that the second plurality of samples is equal to four. The number of total samples, and the first and second pluralities can be different in other embodiments. At step 24, adversarial examples are created from one or more of the second plurality of samples to create a modified second plurality of samples. The adversarial examples may be for the first category, which is, e.g., category X in FIG. 2. As illustrated in FIG. 3, samples 36 and 46 are modified to be adversarial examples 36' and 46', respectively, both for category X. A reason for using category X for adversarial examples 36' and 46' is so that the ML model of the attacking computer will not provide the correct category classification as a possible result classification but having a lower confidence. Samples 38 and 50 are not modified but could also be modified to be adversarial examples. At step 26, CAPTCHA test 30' can then be presented to a potential user of the protected resource. The CAPTCHA test can be presented in various ways. For example, CAPTCHA test 30' is presented as illustrated in FIG. 3 as an array of possible answer images positioned proximate to reference sample 32'. In another embodiment, the CAPTCHA may be presented differently.

The method provides a defense against computer, or bot, attacks that use a ML model for sample classification. The described method makes it more difficult for a computer with an ML model to pass a CAPTCHA test while also not making the test more difficult for humans to pass.

Figure 4:
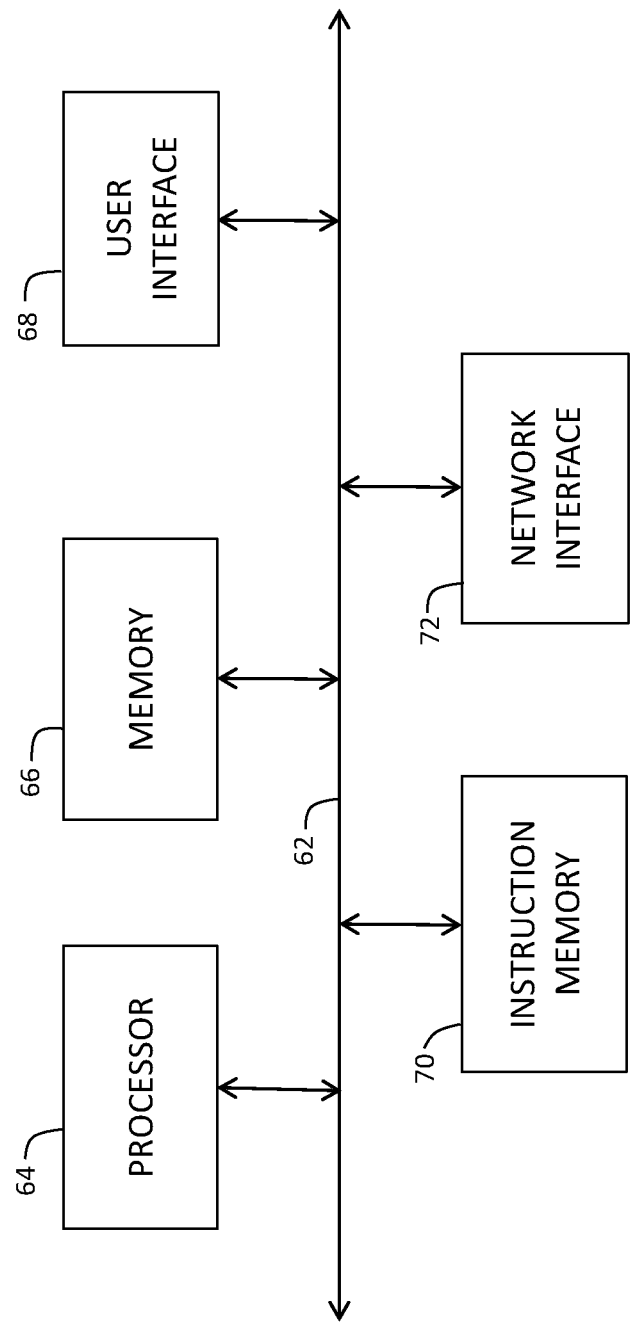
FIG. 4 illustrates a data processing system useful for implementing the method of FIG. 1.

FIG. 4 illustrates data processing system 60 for implementing method 10 of FIG. 1. Data processing system 60 may be implemented on one or more integrated circuits and may be used in an implementation of the described embodiments. Data processing system 60 includes bus 62. Connected to bus 62 is processor 64, memory 66, user interface 68, instruction memory 70, and network interface 72. Processor 64 may be any hardware device capable of executing instructions stored in memory 66 or instruction memory 70. For example, processor 64 may execute instructions of implementing ML algorithms useful for performing method 10. Processor 64 may have multiple processing cores. Processor 64 may be, for example, a microprocessor, field programmable gate array (FPGA), application-specific integrated circuit (ASIC), or similar device. Processor 64 may be implemented in a secure hardware element and may be tamper resistant.

Memory 66 may be any kind of memory, such as for example, L1, L2, or L3 cache or system memory. Memory 66 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. In one embodiment, memory 66 is used to store weight matrices for the ML model or some of the images for creating a CAPTCHA.

User interface 68 may be connected to one or more devices for enabling communication with a user such as an administrator. For example, user interface 68 may be enabled for coupling to a display, a mouse, a keyboard, or other input/output device. Network interface 72 may include one or more devices for enabling communication with other hardware devices. For example, network interface 72 may include, or be coupled to, a network interface card (NIC) configured to communicate according to the Ethernet protocol. Also, network interface 72 may implement a TCP/IP stack for communication according to the TCP/IP protocols. Data samples for classification may be input via network interface 72, or similar interface. Various other hardware or configurations for communicating are available.

Instruction memory 70 may include one or more machine-readable storage media for storing instructions for execution by processor 64. In other embodiments, both memories 66 and 70 may store data upon which processor 64 may operate. Memories 66 and 70 may also store, for example, encryption, decryption, and verification applications. Memories 66 and 70 may be implemented in a secure hardware element and be tamper resistant.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a test for distinguishing humans from computers, the method comprising:
   selecting a first category;
   selecting a reference sample in the selected first category;
   selecting a first plurality of samples, the first plurality of samples selected from the first category;
   creating adversarial examples for one or more of the first plurality of samples to create a modified first plurality of samples, each of the adversarial examples for one or more other categories different from the first category;
   selecting a second plurality of samples, the second plurality of samples selected from the one or more other categories different from the first category;
   creating an adversarial example of one or more of the second plurality of samples for the first category to create a modified second plurality of samples; and
   presenting the reference sample and the modified first and second pluralities of samples with the adversarial examples for testing by a user to determine if the user is a human or a computer.

2. The method of claim 1, further comprising creating an adversarial example of the reference sample that is for a second category different from the first category.

3. The method of claim 1, wherein the reference sample and the first and second pluralities of samples are images.

4. The method of claim 1, wherein the reference sample and the first and second pluralities of samples are audio files.

5. The method of claim 1, wherein an adversarial example is created by adding noise to a sample.

6. The method of claim 1, wherein creating adversarial examples for one or more of both the first and second pluralities of samples further comprises creating adversarial examples for all the first and second pluralities of samples.

7. The method of claim 1, wherein creating adversarial examples for one or more of the first plurality of samples further comprises creating adversarial examples for one or more of the first plurality of samples that are for one or more of the same categories as the second plurality of samples.

8. The method of claim 1, wherein the testing by a user to determine if the user is a human or a computer further comprises testing using a Completely Automated Public Turing Tests to tell Computers and Humans Apart (CAPTCHA) test.

9. The method of claim 1, wherein creating adversarial examples for the one or more of the first and second pluralities of samples further comprises creating each of the adversarial examples to target a different machine learning algorithm.

10. A method for generating a test for distinguishing humans from computers, the method comprising:
    selecting a first category;
    selecting a reference sample in the selected first category;
    creating an adversarial example of the reference sample for a second category different from the first category;
    selecting a first plurality of samples, the first plurality of samples selected from the first category;
    creating adversarial examples for one or more of the first plurality of samples to create a modified first plurality of samples, each of the adversarial examples for one or more other categories different from the first category;
    selecting a second plurality of samples, the second plurality of samples selected from the one or more other categories;
    creating an adversarial example of one or more of the second plurality of samples for the first category to create a modified second plurality of samples; and
    presenting the reference sample and the modified first and second pluralities of samples for testing by a user to determine if the user is a human or a computer.

11. The method of claim 10, wherein the reference sample and the first and second pluralities of samples are images.

12. The method of claim 10, wherein creating adversarial examples for one or more of both the first and second pluralities of samples further comprises creating adversarial examples for all of the first and second pluralities of samples.

13. The method of claim 10, wherein creating adversarial examples for one or more of the first plurality of samples further comprises creating adversarial examples for one or more of the first plurality of samples that are for the same categories as one or more samples of the second plurality of samples.

14. The method of claim 10, wherein the testing by a user to determine if the user is a human or a computer further comprises testing using a Completely Automated Public Turing Tests to tell Computers and Humans Apart (CAPT-CHA) test.

15. The method of claim 10, wherein creating adversarial examples for the one or more of the first and second pluralities of samples further comprises creating each of the adversarial examples to target a different machine learning algorithm.

16. A non-transitory machine-readable storage medium comprising computer-readable instructions executable by a microprocessor to:
   select a first category;
   select a reference sample in the selected first category;
   select a first plurality of samples, the first plurality of samples selected from the first category;
   create adversarial examples for one or more of the first plurality of samples to create a modified first plurality of samples, each of the adversarial examples for one or more other categories different from the first category;
   select a second plurality of samples, the second plurality of samples selected from the one or more other categories different from the first category;
   create an adversarial example of one or more of the second plurality of samples for the first category to create a modified second plurality of samples; and
   present the reference sample and the modified first and second pluralities of samples for testing by a user to determine if the user is a human or a computer.

17. The non-transitory machine-readable storage medium of claim 16, further comprising instructions to create an adversarial example of the reference sample for a second category different from the first category.

18. The non-transitory machine-readable storage medium of claim 16, wherein the instructions to create adversarial examples for one or more of both the first and second pluralities of samples further comprises instructions to create adversarial examples for all the first and second pluralities of samples.

19. The non-transitory machine-readable storage medium of claim 16, wherein the instructions to create the adversarial examples for the one or more of the first plurality of samples, further comprises instructions to create adversarial examples for one or more of the first plurality of samples that are for the same categories as the second plurality of samples.

20. The non-transitory machine-readable storage medium of claim 16, wherein the instructions to create adversarial examples for the one or more of the first and second pluralities of samples further comprises instructions to create each of the adversarial examples to target a different machine learning algorithm.

* * * * *